United States Patent [19]

Johnston

[11] 3,719,612

[45] March 6, 1973

[54] SYNTHESIS OF IONICALLY CONDUCTIVE COMPOSITIONS OF MATTER

[75] Inventor: William V. Johnston, Camarillo, Calif.

[73] Assignee: North American Rockwell Corporation, El Segundo, Calif.

[22] Filed: Dec. 8, 1970

[21] Appl. No.: 96,228

[52] U.S. Cl. .................................. 252/518, 423/463
[51] Int. Cl. .............................................. H01b 1/02
[58] Field of Search ............. 252/518; 23/87, 89, 367

[56] References Cited

UNITED STATES PATENTS 3,519,404   7/1970   Argue et al. ........................... 252/518
2,944,975   7/1960   Folberth ................................ 252/204

OTHER PUBLICATIONS

Jacobson: Encyclopedia of Chemical Reactions, Vol. V1, 1956, pg. 162.

Primary Examiner—George F. Lesmes
Assistant Examiner—J. P. Brammer
Attorney—L. Lee Humphries, Thomas S. MacDonald and Henry Kolin

[57] ABSTRACT

A process for the preparation of a solid ionically conductive composition of matter of either the formula:

1. $MAg_4I_5$ in which M is Rb, K, $NH_4$, Cs, or a combination of these, Cs being present only as a minor constituent of M; or 2. $QAg_nI_{n+1}$, where n has a value from 3 to 39 inclusive and Q is an organic ammonium cation having an ionic volume between 30 and 85 cubic angstroms; comprising reacting approximately stoichiometric quantities, corresponding to the ionically conductive compositions formed, of AgI and either MI or QI in a liquid reaction medium selected from hydriodic acid, hydrobromic acid, and methyl iodide, and separating the synthesized ionically conductive composition from the reaction medium.

10 Claims, No Drawings

SYNTHESIS OF IONICALLY CONDUCTIVE COMPOSITIONS OF MATTER

BACKGROUND OF THE INVENTION

This invention relates to a process for the preparation of ionically conductive compositions of matter having unusually high ionic conductivity. It particularly relates to a process for the preparation of compounds having the formula (1) $MAg_4I_5$ in which M is Rb, $NH_4$, K, Cs, or a combination of these, Cs being present only as a minor constituent of M; and (2) $QAg_nI_{n+1}$, where $n$ has a value from 3 to 39 inclusive and Q is an organic ammonium cation having an ionic volume between 30 and 85 cubic angstroms. Such compositions are particularly useful as electrolytes in solid state electric cells. Electric cells containing these electrolyte materials are described in U. S. Pat. Nos. 3,443,997 and 3,476,606, respectively.

Compositions of the foregoing type, $MAg_4I_5$ and $QAg_nI_{n+1}$ have recently been shown to have high ionic conductivity in the solid state over a wide range of temperatures. The known methods of preparing these compositions involve mixing appropriate amounts of the solid reactants MI and AgI or QI and AgI in the desired molar ratios, and either heating the mixture until molten, followed by a holding period at a lower temperature to form the desired compound (melt-anneal technique), or reacting the solid reactants in a time-consuming solid state reaction at 200°C or higher to form the compound. In an alternative method of preparation of $MAg_4I_5$, the constituents are dissolved in acetone and precipitated by evaporation. However, this method results in a mixture of the desired compound and another compound, generally of high resistivity, rather than the pure ionically conductive composition. For preparing the organic silver ammonium iodide conductive compositions, $QAg_nI_{n+1}$, a paste preparation technique has also been used in which a slurry or paste is prepared of the silver iodide and the organic ammonium iodide, followed by a multiple annealing technique. Synthesis in an aqueous medium in which the silver iodide and organic ammonium iodide reactants and the formed product exhibit only a limited solubility has also been suggested as feasible.

The present invention provides a simple and convenient method for the preparation of solid ionically conductive materials from selected solutions. The process of this invention is advantageous compared with the methods known to the prior art in that it is more easily adapted to large-scale production, provides for control or variation of the composition of the materials formed, and may be used to produce large crystals or thin films of the desired compound. The present process does not require the use of a high temperature, and the synthesized compositions may be easily recovered from the reaction medium.

The compositions prepared by the process of this invention have a high ionic conductivity and may be used in a variety of electrochemical devices. The process is of particular utility for preparing compositions for use in thin-film and single-crystal devices.

SUMMARY OF THE INVENTION

The solid ionically conductive compositions which may be prepared by the process of this invention have either the general formula:

1. $MAg_4I_5$ in which M is Rb, K, $NH_4$, Cs, or combinations thereof, Cs being present only as a minor constituent of M; or
2. $QAg_nI_{n+1}$, where n has a value from 3 to 39 inclusive and Q is an organic ammonium cation having an ionic volume between 30 85 cubic angstroms.

According to the process of this invention, AgI and a compound MI or QI (M and Q as above defined) are reacted in approximately stoichiometric amounts, corresponding to the ratios of the compositions formed, in a liquid reaction medium selected from hydriodic acid, hydrobromic acid, and methyl iodide. The liquid reaction medium is preferably in concentrated form, although dilute aqueous solutions of hydriodic and hydrobromic acids, alone or in admixture, may also be used. The solubility of AgI and of RbI in the mixed acids decreases with increasing concentration of HBr. A solvent containing at least 45–50% by weight of hydriodic acid is particularly preferred because of the greater solubility of silver iodide and of the alkali metal and organic ammonium iodides in such concentrated hydriodic acid. After reaction, the synthesized compositions are recovered from the reaction medium by precipitation, either by adding an additional component to reduce the solubility of the ionically conductive compositions of by evaporation of the solvent.

DESCRIPTION OF THE PREFERRED EMBODIMENTS

In the practice of the process of the present invention in its preferred aspects, the appropriate amount of silver iodide is dissolved in the reaction medium, and the appropriate amount of the second iodide, or combination of iodides, is then added. For example, to form the composition $RbAg_4I_5$, the components are used in a ratio of 4AgI:RbI. In preparing the alkali metal silver iodides, the second iodide may be rubidium iodide, potassium iodide, ammonium iodide, cesium iodide, or combinations thereof. Cesium iodide where used constitutes less than 50 percent by weight of the second iodide, and is present only in combination with one or more of the other alkali metal iodides.

To prepare the organically substituted ammonium silver iodides, the organic ammonium iodide components and the molar ratios used are essentially as described in U. S. Pat. No. 3,476,606, particularly as set forth in Column 3 thereof. Thus n moles of AgI will be reacted with each mole of QI to give the organic ammonium silver iodide compound having the formula $QAg_nI_{n+1}$ where n has any value between 3 and 39. Preferably, 4 to 9 molar portions of silver iodide are reacted with each molar portion of QI. For example, to prepare a preferred compound, 6½ moles of AgI are reacted with 1 mole of $NR_4I$, where R is preferably a lower alkyl group such as methyl, ethyl, propyl, or butyl.

The second iodide, MI or QI, may be added to the reaction medium as a solid or as an aqueous solution. It is preferable to add the second iodide as an aqueous solution or slurry, particularly when using the preferred solvent for the present process, namely, concentrated hydriodic acid.

The process may be carried out at any suitable temperature, for example, from slightly above room temperature to about 100°C. Preferably, the temperature is above 50°C. The synthesized compositions are easily recovered from the reaction medium.

Recovery from the reaction medium solution may conveniently and preferably be made in either of two ways. In the first method, the reaction medium solution is evaporated to dryness. The solid which remains is the ionically conductive material. This is dried by heating it at a temperature of about 50°–150°C for 0.5 to 5 hours, preferably between 50° and 100°C.

In another method, the synthesized ionically conductive composition may be separated as a solid from the reaction medium by extraction with an alcohol at room temperature or preferably slightly warmed, e.g., 40°–60°C. To the reaction medium containing the synthesized ionically conductive material, an approximately equal volume of warm lower alkyl alcohol is added. The mixture is stirred briefly and allowed to separate into layers. The upper alcohol layer contains a white solid, which may be separated from the alcohol, for example, by decanting and filtering the alcohol while warm or by other suitable methods. Or the warm mixture of the reaction medium containing the ionically conductive composition and the lower alkyl alcohol may be slowly cooled. Thereby the ionically conductive composition is caused to precipitate therefrom and may be separated by decanting or filtration. The residue, which is the solid ionically conductive composition, is dried, for example, by heating at 50°–150°C for about 0.5 to 5 hours. Ethanol and isopropyl alcohol are especially useful for extracting the ionically conductive composition in this second method. In using this method, care must be taken to avoid the use of excess amounts of alcohol since this may result in precipitation of small amounts of AgI from the reaction medium, thereby contaminating the ionically conductive composition.

With either of the methods described above, a purer product may be obtained by washing the precipitate with a dry lower alkyl alcohol; or fractional crystallization may be employed, using the solvent of the reaction medium, for example HI, and a lower alkyl alcohol. In this way, any AgI or other compounds that may have precipitated with the ionically conductive composition, or any reaction medium still remaining, can more effectively be removed.

The present process is especially useful for preparing ionically conductive compositions for use in thin-film and single-crystal electrochemical devices. By suitable control of the conditions of precipitation and evaporation, thin films or large single crystals of the ionically conductive compositions may be produced in a relatively simple manner, since removal of the solvent by evaporation leaves the compound behind.

The following examples serve to illustrate the invention, but are in no way considered limiting thereto:

EXAMPLE 1

6.5 g. AgI is dissolved in 35 ml. concentrated HI (47–50 wt. percent HI in water). 1.5 g. RbI is added to the solution and dissolved. The resulting solution is evaporated slowly on a hot plate until dry. The residue was found by x-ray diffraction tests to be $RbAg_4I_5$ with a small amount of HI associated therewith. The HI is removed by washing the residue with absolute ethanol.

EXAMPLE 2

Example 1 was repeated, except that after addition of AgI and RbI the reaction medium is not evaporated. Instead, absolute ethanol is added until the solution becomes cloudy. Upon heating the solution and then cooling slowly, a flocculent precipitate is formed, which is separated by decanting the reaction medium. After drying, the precipitate was found to be $RbAg_4I_5$, with some $Rb_2AgI_3$ associated therewith.

EXAMPLE 3

Example 2 was repeated, except that after decanting the reaction medium, the precipitate is washed with absolute ethanol, redissolved in concentrated HI, and reprecipitated by the addition of fresh absolute ethanol. The redissolving and recrystallization steps are repeated. The precipitate is then dried and was found to be $RbAg_4I_5$, with the $Rb_2AgI_3$ removed.

Example 4

Example 2 was repeated, except that after addition of the absolute ethanol and precipitation of the $RbAg_4I_5$, additional excess ethanol is added, without decanting the reaction medium. Upon drying the precipitate, it was found to be $RbAg_4I_5$ combined with a slight amount of AgI.

Example 5

1 g. AgI is dissolved in 250 ml. methyl iodide. 0.23 g. RbI is added to the solution and dissolved. Methyl iodide is removed by evaporation, resulting in precipitation of the ionically conductive composition $RbAg_4I_5$. The ionically conductive $RbAg_4I_5$ is also formed by dissolving the AgI and RbI in the methyl iodide and adding ethyl alcohol to the solution to precipitate the $RbAg_4I_5$ therefrom.

EXAMPLE 6

1 g. AgI is dissolved in 250 ml. of a 50:50 mixture of concentrated HBr and HI. Upon evaporation of the solvent $RbAg_4I_5$ is recovered.

When the proportion of HBr in the mixed solvent is increased, greater quantities of solvent are required because of the lowered solubility of the AgI and RbI therein.

EXAMPLE 7

9.39 g. AgI is dissolved in 50 ml. concentrated HI (47–50 wt. percent). To this is added 1.24 g. tetramethyl ammonium iodide. Because of the lower solubility of the organic ammonium iodide, additional HI is added until a clear solution is obtained. The solution is evaporated by dryness; the recovered residue is washed with absolute alcohol and further purified by fractional crystallization using HI and absolute ethyl alcohol. The recovered precipitate was electrically conductive, and x-ray diffraction confirmed its identity as the desired compound $[(CH_3)_4N]_2Ag_{13}I_{15}$ which corresponded to the initial ratio used of 6½:1 $AgI:N(CH_3)_4I$.

Compounds made according to the process of this invention are prepared combining stoichiometric proportions corresponding to 4AgI:MI or nAgI:QI, e.g., $RbAg_4I_5$ or 6½$AgI:N(C_2H_5)_4I$. However, small amounts of the starting compounds or of adventitious impurities which may be present will not unduly decrease the ionic conductivity values. Further, certain inorganic compounds such as silica as well as organic polymers and other additives may be included with the pure compounds for purposes of moisture absorption, stability, etc.

It will of course be realized that various modifications can be made in the design and operation of the present invention without departing from the spirit thereof. Thus, while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

I claim:

1. A process for preparing an ionically conductive composition of matter of the general formula:

(1) $MAg_4I_5$ where M is Rb, K, $NH_4$, Cs, or combinations thereof, Cs being present only in combination and as a minor constituent of M; or (2) $QAg_nI_{n+1}$, where n has a value from 3 to 39 inclusive and Q is an organic ammonium cation having an ionic volume between 30 and 85 cubic angstroms; which process comprises the steps of (a) reacting silver iodide with a second iodide compound selected from MI and QI in a liquid reaction medium selected from hydriodic acid, hydrobromic acid and methyl iodide, the second iodide compound and silver iodide being present in the reaction medium in about stoichiometric amounts, corresponding to the ionically conductive compositions prepared, and (b) separating the so-prepared solid ionically conductive compositions of matter from the reaction medium.

2. The process according to claim 1 wherein the reaction medium consists essentially of concentrated hydriodic acid.

3. The process according to claim 1 wherein step (b) comprises evaporating the reaction medium to dryness and drying the remaining solid ionically conductive composition thereby separating the ionically conductive composition from the reaction medium.

4. The process according to claim 1 wherein step (b) comprises forming a mixture of the reaction medium containing the ionically conductive composition with a lower alkyl alcohol at an elevated temperature, cooling the mixture to thereby cause the ionically conductive composition to precipitate therefrom, and separating the precipitated solid ionically conductive composition from the mixture.

5. The process according to claim 4 wherein the reaction medium is concentrated hydriodic acid and the lower alkyl alcohol is ethanol.

6. The process according to claim 1 wherein step (b) comprises forming a mixture of the reaction medium containing the ionically conductive composition with a lower alkyl alcohol, allowing the mixture to separate into an upper alkyl alcohol layer and a lower layer, separating the alkyl alcohol layer from the mixture, and recovering the solid ionically conductive composition from said alkyl alcohol layer.

7. The process according to claim 6 wherein the reaction medium is concentrated hydriodic acid and the lower alkyl alcohol is ethanol.

8. The process according to claim 1 wherein the reaction medium of step (a) consists essentially of concentrated hydriodic acid and step (b) further includes purifying the separated ionically conductive material by fractional crystallization with ethanol and hydriodic acid.

9. The process according to claim 1 wherein M is Rb and the formed solid ionically conductive composition is $RbAg_4I_5$.

10. The process according to claim 1 wherein an organic ammonium silver iodide composition is prepared by reacting from 4 to 9 moles of AgI with each mole of $NR_4I$ where R represents at least one lower alkyl group selected from methyl, ethyl, propyl, and butyl.

* * * * *

PO-1050
(5/69)

UNITED STATES PATENT OFFICE
CERTIFICATE OF CORRECTION

Patent No. 3,719,612     Dated March 6, 1973

Inventor(s) William V. Johnston

It is certified that error appears in the above-identified patent and that said Letters Patent are hereby corrected as shown below:

Column 2, line 6, "30 85" should read --30 and 85--;
Column 3, line 7, "THis" should read --This--.
Column 4, line 56, "by" should read --to--;
Column 4, line 63, "6^1/21" should read --6 1/2:1--.
Column 6, line 39, "$Nr_4I$" should read --$NR_4I$--.

Signed and sealed this 7th day of May 1974.

(SEAL)
Attest:

EDWARD M.FLETCHER,JR.
Attesting Officer

C. MARSHALL DANN
Commissioner of Patents